(12) United States Patent
Miller et al.

(10) Patent No.: US 6,605,570 B2
(45) Date of Patent: Aug. 12, 2003

(54) COMPOSITIONS AND METHODS TO CONTROL FLUID LOSS IN SURFACTANT-BASED WELLBORE SERVICE FLUIDS

(75) Inventors: Matthew J. Miller, Missouri City, TX (US); Mathew Samuel, Punalur (IN); Palathinkara S. Vinod, Poteau, OK (US); Thomas N. Olsen, Denver, CO (US)

(73) Assignee: Schlumberger Technology Corporation, Sugar Land, TX (US)

( * ) Notice: Subject to any disclaimer, the term of this patent is extended or adjusted under 35 U.S.C. 154(b) by 82 days.

(21) Appl. No.: 09/851,925

(22) Filed: May 8, 2001

(65) Prior Publication Data

US 2002/0169085 A1 Nov. 14, 2002

Related U.S. Application Data (60) Provisional application No. 60/272,650, filed on Mar. 1, 2001.

(51) Int. Cl.[7] .............................. E21B 43/26; C09K 3/00
(52) U.S. Cl. ........................ 507/211; 507/209; 507/212; 507/216; 507/240; 507/265; 507/271; 507/273; 507/225; 507/903; 507/922; 166/308; 166/278
(58) Field of Search .................... 507/209, 211, 507/212, 216, 240, 265, 271, 273, 922, 903, 110, 111, 114, 120, 225, 133; 166/308, 278

(56) References Cited

U.S. PATENT DOCUMENTS

| | | |
|---|---|---|
| 4,488,975 A | 12/1984 | Almond |
| 4,521,452 A | 6/1985 | Highsmith |

(List continued on next page.)

FOREIGN PATENT DOCUMENTS

| | | |
|---|---|---|
| CA | 1298697 | 10/1987 |
| CA | 2257699 | 12/1998 |
| EP | 0 725 206 | 8/1996 |
| EP | 0 835 983 | 4/1998 |
| GB | 2332224 A | 6/1999 |
| WO | WO 98/56497 | 12/1998 |
| WO | WO 01/18147 | 3/2001 |

OTHER PUBLICATIONS

Economides, M. J. and Nolte, K. G., *Reservoir Stimulation*, 3rd Edition, John Wiley and Sons, New York, 2000, Chapters 5, 7 and 8. The table of contents of the entire book has been included for convenience.

(List continued on next page.)

*Primary Examiner*—Philip Tucker
(74) *Attorney, Agent, or Firm*—Thomas O. Mitchell; Catherine Menes; Brigitte Jeffery (57) ABSTRACT

Herein is disclosed a well completion or stimulation fluid, comprising (i) a carrier fluid; (ii) a viscoelastic surfactant; and (iii) a fluid loss control additive (FLA) comprising at least one polymer and at least one crosslinker. The fluid may further comprise proppant or gravel, if it is intended for use as a fracturing fluid or a gravel packing fluid, although such uses do not require that the fluid comprise proppant or gravel. Also disclosed herein are methods of fracturing a subterranean formation, comprising (i) providing a fracturing fluid discussed above and (ii) injecting the fracturing fluid into the formation at a pressure sufficiently high to fracture the formation. In addition, disclosed herein are methods of gravel packing a wellbore, comprising (i) providing a gravel packing fluid discussed above and (ii) injecting the gravel packing fluid into the wellbore.

29 Claims, 2 Drawing Sheets

U.S. PATENT DOCUMENTS

| | | |
|---|---|---|
| 4,683,949 A | 8/1987 | Sydansk et al. |
| 4,695,389 A | 9/1987 | Kubala |
| 4,725,372 A | 2/1988 | Teot et al. |
| 4,741,401 A | 5/1988 | Walles et al. |
| 5,159,979 A | 11/1992 | Jennings ..................... 166/280 |
| 5,182,408 A | 1/1993 | Sharif |
| 5,246,073 A | 9/1993 | Sandiford et al. |
| 5,335,733 A | 8/1994 | Sandiford et al. |
| 5,466,846 A | 11/1995 | Sharif |
| 5,486,312 A | 1/1996 | Sandiford et al. |
| 5,551,516 A | 9/1996 | Norman et al. |
| 5,617,920 A | 4/1997 | Dovan et al. |
| 5,658,861 A | 8/1997 | Nelson et al. |
| 5,680,900 A | 10/1997 | Nguyen et al. |
| 5,697,444 A | 12/1997 | Moorhouse et al. |
| 5,782,300 A | 7/1998 | James et al. |
| 5,827,804 A | 10/1998 | Harris et al. |
| 5,877,127 A | 3/1999 | Card et al. |
| 5,929,002 A | 7/1999 | Joyce et al. |
| 5,947,644 A | 9/1999 | Gibbons et al. |
| 5,948,733 A | 9/1999 | Cawiezel et al. |
| 5,964,295 A | 10/1999 | Brown et al. |
| 6,024,170 A | 2/2000 | McCabe et al. |
| 6,035,936 A | 3/2000 | Whalen |
| 6,194,356 B1 * | 2/2001 | Jones et al. .................. 507/209 |
| 6,306,800 B1 * | 10/2001 | Samuel et al. ............... 507/922 |
| 6,412,561 B1 * | 7/2002 | Brown ........................ 166/308 |
| 6,433,075 B1 * | 8/2002 | Davies et al. ................ 524/815 |

OTHER PUBLICATIONS

Sydansk, R.D., "A New Conformance–Improvement–Treatment Chromium(III) Gel Technology," SPE Paper 17329, 1988.

Navarette, R.C., Cawiezel, K. E., and Constien, V. G., "Dynamic Fluid Loss in Hydraulic Fracturing Under Realistic Shear Conditions in High–Permeability Rocks," *SPE Production and Facilities*, Aug., 1996, pp. 138–143.

S. Panmai et al., "Rheology of Hydrophobically Modified Polymers with Spherical and Rod–Like Surfactant Micelles," *Coll. and Surf. A*, 147, 3–15 (1999).

* cited by examiner

COMPOSITIONS AND METHODS TO CONTROL FLUID LOSS IN SURFACTANT-BASED WELLBORE SERVICE FLUIDS

This application claims benefit of provisional application 60/272,650 filed Mar. 1, 2001.

BACKGROUND OF THE INVENTION

1. Field of the Invention

This invention relates to wellbore services, especially the drilling, completion or stimulation of hydrocarbon wells, and in particular to fluids and methods for drilling or drill-in with minimal fluid loss to the overburden or productive pay, hydraulic fracturing of a subterranean formation with minimal loss of fluid to the formation during fracturing, or to gravel packing a subterranean formation with minimal loss of fluid to the formation during gravel packing.

2. Description of Related Art

Hydrocarbons (oil, natural gas, etc.) are obtained from a subterranean geologic formation by drilling a well that penetrates the hydrocarbon-bearing formation. This provides a partial flowpath for the hydrocarbon to reach the surface. In order for the hydrocarbon to be produced there must be a sufficiently unimpeded flowpath from the formation to the wellbore. This flowpath is through the formation rock, which has pores of sufficient size, connectivity, and number to provide a conduit for the hydrocarbon to move through the formation.

One reason why low production sometimes occurs is that the formation is naturally "tight" (low permeability), that is, the pore throats are so small that the hydrocarbon migrates toward the wellbore only very slowly. Alternatively, or in combination, the formation or wellbore may be "damaged" by, e.g., dehydration of drilling or drill-in fluid; the presence of certain types of hydrocarbon, i.e. waxes and asphaltenes; and the occurrence of inorganic scale. The common denominator in both cases (damage and tight formations) is low permeability.

Techniques performed by hydrocarbon producers to increase the net permeability of the formation are referred to as "stimulation." Essentially, one can perform a stimulation technique by: (1) injecting chemicals into the wellbore and/or into the formation to react with and dissolve the damage; (2) injecting chemicals through the wellbore and into the formation to react with and dissolve small portions of the formation to create alternative flowpaths for the hydrocarbon (thus rather than removing the damage, redirecting the migrating hydrocarbon around or through the damage); (3) injecting chemicals into the wellbore that will contact drilling or drill-in fluid filter cake that resides along the face of the wellbore thus removing filter cake from the wellbore face; or (4) injecting chemicals through the wellbore and into the formation at pressures sufficient to fracture the formation ("hydraulic fracturing"), thereby creating a large flow channel though which hydrocarbon can more readily move from the formation and into the wellbore. With respect to stimulation, the present invention is directed primarily to the fourth of these processes, but applies to all four processes in instances where a need to control the rate of treatment fluid lost into the formation is beneficial.

Hydraulic fracturing involves breaking or fracturing a portion of the surrounding strata, by injecting a fluid into a formation through the wellbore, and through perforations if the well has been cased, at a pressure and flow rate sufficient to overcome the minimum in situ stress (also known as minimum principal stress) to initiate or extend a fracture(s) into the formation.

This process typically creates a fracture zone having one or more fractures in the formation through which hydrocarbons can more easily flow to the wellbore.

Since the main functions of a fracturing fluid are to initiate and propagate fractures and to transport a proppant (usually sand, glass or ceramic beads used to hold the walls of the fracture apart after the pumping has stopped and the fracturing fluid has leaked off or flowed back) the viscous properties of the fluids are most important. Many known fracturing fluids comprise a water-based carrier fluid, a viscosifying agent, and the proppant. The viscosifying agent is often a cross-linked water-soluble polymer. As the polymer undergoes hydration and crosslinking, the viscosity of the fluid increases and allows the fluid to initiate the fracture and to carry the proppant. Another class of viscosifying agent is viscoelastic surfactants ("VES's").

Both classes of fracturing fluids (water with polymer, and water with VES) can be pumped as foams or as neat fluids (i.e. fluids having no gas dispersed in the liquid phase). Foamed fracturing fluids typically contain nitrogen, carbon dioxide, or mixtures thereof at volume fractions ranging from 10% to 90% of the total fracturing fluid volume. The term "fracturing fluid," as used herein, refers to both foamed fluids and neat fluids.

VES-based fracturing fluids, like other fracturing fluids, may leak-off from the fracture into the formation during and after the fracturing process. The VES leak-off is viscosity controlled, and the leak-off rate depends on several factors, including formation permeability, formation fluids, applied pressure drop, and the rheological properties of the VES fluids. Leak-off is particularly problematic in medium to high permeability formations (greater than about 2 mD, especially greater than about 10 mD, most especially greater than about 20 mD). The rate at which fluid leaks off from the fracture generally increases with increasing rock permeability and with increasing net positive pressure differential between the fluid in the fracture and the pore pressure of fluid in the formation. Fluid loss is a term often used for the flow of fracturing fluid into the formation from the fracture. (The terms "fluid loss" and "leak-off" are used interchangeably herein.) Fluid loss control is a term often used to indicate measures used to govern the rate and extent of fluid loss. The consequence of high fluid loss (also referred to as low fluid efficiency, where fluid efficiency is inversely proportional to the fluid loss into the formation) is that it is necessary to inject larger volumes of a fracturing fluid in order to create the designed fracture geometry, i.e., fracture length and width sufficient to hold all the injected proppant. Use of low efficiency fluids can increase the time and expense required to perform the fracturing operation. U.S. Pat. No. 5,964,295, which is hereby incorporated by reference, describes VES fluids developed in particular for use in low permeability formations and indicates that VES fluids are not normally used in high permeability applications unless the size of the job and the volume of fluids needed are small.

Viscosified fluids are also used in other wellbore services, such as sand control, drilling and completion. Gravel packing and "drill-in" (which is drilling in the productive formation) with special fluids are two techniques that are commonly used to minimize damage to the producing zone during the completion process.

Sand control is the term used to describe the prevention or minimization of the migration of fine, mobile particles during hydrocarbon production. In this connection, "sand" is used to describe any such particles and the formation need not be a sand or sandstone. Sand control can involve an operation where a device is first placed into the wellbore across the producing interval that serves to filter fine, mobile formation particles from the produced oil, water, or gas. This device is often called a sand control screen. Frequently, a graded material (such as 20/40 mesh sand) is placed such that it completely occupies the annular space between the exterior of the screen and the sand face. This "gravel pack" is designed to further filter mobile particles from the produced oil, water, or gas so that those particles do not cause screen blocking or erosion. The gravel is placed in this annular gap by pumping a slurry which is typically an aqueous fluid containing the gravel. This slurry is injected from the surface and is diverted into the annulus once the fluid reaches the depth of the screen. The carrier fluid often contains materials to viscosify it and enhance the performance of the slurry. The viscosifying materials may include polymers (such as guar or hydroxypropylguar) and a crosslinker. As the polymer undergoes gelation and crosslinking, the viscosity of the fluid increases and allows the fluid to carry the gravel (commonly sand, or glass or ceramic beads). Another class of gravel packing fluids comprises water or brine as a carrier fluid, a viscoelastic surfactant, and a gravel. The viscoelastic surfactant provides a viscosity and elasticity high enough to carry gravel. These polymer-free gravel carrier fluids have some of the same high fluid loss issues as the aforementioned polymer-based fracturing fluids, especially in high permeability formations, as described in U.S. Pat. No. 5,964,295, which is hereby incorporated by reference.

To overcome the tendency of high fluid loss in polymeric and VES-based fracturing fluids and gravel carrier fluids under some conditions, various fluid loss control additives (FLAs) have been tried. Silica, mica, and calcite, alone, in combination, or in combination with starch, are known to reduce fluid loss in polymer-based fracturing fluids, by forming a filter cake, on the formation face, which is relatively impermeable to water, as described in U.S. Pat. No. 5,948,733. Use of these FLAs alone in a VES-based fracturing fluid, however, has been observed to give only modest decreases in fluid loss from VES-based fracturing and gravel-packing fluids, as described in U.S. Pat. No. 5,929,002, which is hereby incorporated by reference. It would be desirable to find an FLA that would be much more effective in VES-based fluids.

Nguyen et al., U.S. Pat. No. 5,680,900 teaches the crosslinking of guar in solution, the shearing of the crosslinked guar to form a fine particulate slurry, and injecting the slurry into a formation. The slurry imparts reduced fluid loss to fluids containing the slurry or from later fluids injected into the formation. Nguyen teaches that the FLA must be precrosslinked, then finely chopped up, and then added to a completion or stimulation fluid. Moreover, Nguyen teaches the use of enormous concentrations of the FLA, on the order of 25% by weight of the chopped crosslinked gel materials.

Jones et al., UK Pat. No. GB2,332,224 teaches the use of a wellbore service fluid for water control operations comprising a viscoelastic surfactant and very high concentrations of a cross-linkable water-soluble polymer and a crosslinking agent. Inorganic ions or polar organic molecules can be used as crosslinkers. The objective of the Jones patent is to enhance gel strength of the viscoelastic surfactant (VES)-based wellbore service fluid. Jones et al. does not discuss the use of such fluids to minimize fluid loss during drilling, drill-in, completion or stimulation.

Polymer-free drilling, drill-in, completion, fracturing and gravel packing fluids have very poor fluid efficiency and a tendency to leak off into medium to high permeability media (especially greater than approximately 2 mD). These problems stem from the lack of a wall building component for fluid loss control; that is, all leak-off control in such systems is due only to viscous forces and the compressibility of reservoir fluids. In medium to high permeability formations, increasing wellbore service fluid viscosity alone may not suffice to reduce fluid loss to practical levels. Although VES-based materials can be used alone, it would often be better to increase fluid loss control properties. As mentioned before, conventional wall-building fluid loss control additives alone, such as those containing silica, mica, limestone, rock salt, kaolin, talc, alumina or mixtures thereof, do not perform well in polymer free fluids because there is a period of high leak-off (spurt) before a filter cake is formed and because the filter cake may be too permeable to the polymer free fluid. The inventors have found that conventional viscosifying materials, such as polymers, do not create enough viscosity (for example starch), or themselves leak off into the formation (for example uncrosslinked guar), when used to control early leak-off in polymer free systems.

Therefore, it is desirable to have a VES-based drilling, drill-in, gravel packing or fracturing fluid comprising one or more FLAs which reduce fluid loss, especially spurt, during drilling, drill-in, gravel packing and fracturing operations.

The preceding and following discussions are in terms of hydrocarbon-producing wells, but are also applicable to other types of wells, such as water-producing wells or water-injection wells.

SUMMARY OF THE INVENTION

It would be suitable that FLAs for polymer free wellbore service fluids form a filter cake rapidly and do not penetrate into the formation. We have discovered that adding small amounts of a crosslinker and a crosslinkable polymer to a polymer free fluid results in effective fluid loss control.

In one embodiment, the present invention is directed to a wellbore service fluid comprising a carrier fluid, a viscoelastic surfactant, and a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss. More than one polymer and/or more than one crosslinker can be used. The polymer(s) and the crosslinker(s) can form the crosslinked polymer(s) before they are added to the carrier fluid, as soon as they are added to the carrier fluid, after being added to the carrier fluid but before injection into the wellbore, or during or after injection into the wellbore.

In other embodiments, the present invention is directed towards use of the above-described wellbore service fluid in fracturing, gravel packing, drill-in and drilling to reduce fluid loss in these procedures. The method of fracturing comprises providing the wellbore fluid and injecting it into a formation at a pressure sufficiently high to fracture the formation, to form a fractured formation. The FLAs of the present invention can be used in a pre-pad stage, in the pad stage, in the pad and the proppant stages, or in the pad and in some of the proppant stages, in particular the proppant stages that immediately follow the pad. The method of gravel packing comprises providing the wellbore fluid and gravel, and injecting the gravel carrying fluid into the wellbore under conditions that will result in gravel being retained in the annular space between a screen and the formation face. In the drill-in or drilling methods, the fluid loss rate of solids free drilling fluids and drill-in fluids can be reduced by preparing a drilling or drill-in fluid comprising the above-described wellbore fluid and circulating the fluid through the drill string and up the annulus in a manner that removes drill cuttings and lubricates the drill string.

It has been found that the fluids of the present invention exhibit reduced fluid loss during well drilling, completion (including drill-in) or stimulation operations.

BRIEF DESCRIPTION OF THE DRAWINGS

The drawings form part of the present specification and are included to further demonstrate certain aspects of the present invention. The invention may be better understood by reference to the drawings in combination with the detailed description of specific embodiments presented herein.

DESCRIPTION OF ILLUSTRATIVE EMBODIMENTS

While the compositions of the present invention are described herein as comprising certain materials, it should be understood that the compositions can optionally comprise two or more chemically different such materials. For example, the compositions can comprise two or more viscoelastic surfactants, two or more polymers, two or more crosslinkers, etc.

In one embodiment, the present invention is directed to a wellbore services fluid, comprising (i) a carrier fluid; (ii) a viscoelastic surfactant; and (iii) a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss.

By wellbore services fluid is meant any fluid useful in preparing a well for production, and is meant to include drilling fluids, drill-in fluids, fracturing fluids, and gravel packing fluids, among others. Drill-in fluids are fluids used for drilling in producing formations. While the preceding and following discussions are in terms of hydrocarbon-producing wells, they are also applicable to other types of wells, such as water-producing wells and water-injection wells.

The carrier fluid provides a medium for the transport of the other components into the formation. Preferably, the carrier fluid is water or brine. Selected organic acids/salts or any inorganic salt commonly used as the salt component of a brine can be used.

Conventional surfactants, specifically those which tend to form spherical micelles, are generally not capable of forming a viscoelastic composition, particularly an aqueous viscoelastic composition, and are thus generally are not suitable for use in a hydraulic fracturing application. However, certain surfactants, especially including, but not limited to, those which tend to form long rod-like or worm-like micelle structures, are capable of forming an aqueous viscoelastic composition which is readily applicable in hydraulic fracturing. At a relatively low total concentration of a viscoelastic surfactant, as low as 0.3 wt %, typically in the range of about 1 to about 10 wt %, such long rod-like or worm-like micelle structures overlap, forming an entangled network which is viscoelastic. This fluid has unusual proppant or gravel carrying ability, even at low viscosities, compared to conventional crosslinked polymer-based fluids. Typically, these micelle structures are readily destroyed by their interaction with formation fluids such as hydrocarbons, water or brine. When the micellar structures are broken by their interaction with the hydrocarbon fluid, a solution with low viscosity is formed. Thus, as the viscoelastic surfactant based fracturing fluid interacts with produced hydrocarbons, water or brine, a dramatic change in micellar structure (for example, from rod-like or worm-like to spherical micelles) causes a dramatic change in the rheological properties of the fracturing fluid (from a viscoelastic composition to an inviscid solution). It is this "responsive" fluid which facilitates easy removal and clean up of the fluid from the propped fracture so as to maximize hydrocarbon production. Although structures that promote viscoelastic behavior have been referred to herein as rod-like or worm-like, other structures that would result in viscoelasticity are possible.

Broadly speaking, viscoelastic surfactants and their role in formulating fracturing fluids are described in more detail in U.S. Pat. Nos. 4,695,389; 4,725,372; 5,551,516; 5,964,295; 6,035,936; Canadian Patent Nos. 2,257,697 and 2.257,699, and PCT International Patent Publication 98/56497, which are hereby incorporated by reference.

A preferred viscoelastic surfactant comprises erucyl bis(2-hydroxyethyl) methyl ammonium chloride, either alone or in combination with other viscoelastic surfactants. Alternative viscoelastic surfactants may be employed either alone or in combination, including erucyl trimethyl ammonium chloride; N-methyl-N,N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; bis(hydroxyethyl) soya amine; N-methyl, N-hydroxyethyl tallow amine; bis(hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; N,N-dihydroxypropyl hexadecyl amine; N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino, N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate. There are also a wide variety of anionic surfactants (e.g., oleic acid) and zwitterionic surfactants (e.g., euric amide propyl dimethyl betaine, and oleic amide propyl dimethyl betaine) that can be made to form micellar structures that impart viscosity and elasticity to the fluid. The reader is referred to the aforementioned VES fracturing fluid patents for examples.

Viscoelastic surfactants can also comprise N-acyl sarcosines, N-acyl sarcosinates, acyl glutamates and the like. Some examples of suitable materials are: N-acyl sarcosines such as N-oleoyl sarcosine; N-stearoyl sarcosine; N-lauroyl sarcosine; N-myristoyl sarcosine; N-cocoyl sarcosine mixture; sodium N-acyl sarcosinates such as N-methyl-N-(1-oxo-9-octodecenyl) glycine; N-methyl-N-(1-oxooctadecyl) glycine; N-methyl-N-(1-oxododecyl) glycine; N-methyl-N-(1-oxotetradecyl) glycine; and N-cocoyl sarcosine sodium salt mixture. Some suitable materials are available from Hampshire Chemicals, a subsidiary of The Dow Chemical Company, under the tradenames Hamposyl L (Lauroyl Sarcosine); Hamposyl L-30 (Sodium Lauroyl Sarcosinate); Hamposyl C (Cocoyl Sarcosine); Hamposyl O (Oleoyl Sarcosine); Hamposyl M (Myristoyl Sarcosine); Hamposyl Acyl Glutamates; and Hampshire N-Acyl LED3A (Chelating Sarcosine).

Preferably, the viscoelastic surfactant comprises a compound selected from erucyl bis (2-hydroxyethyl) methyl ammonium chloride, oleic acid, euric amide propyl dimethyl betaine or oleic amide propyl dimethyl betaine.

A sufficient quantity of a water soluble organic salt and/or alcohol may optionally be employed with the viscoelastic surfactant to provide desired properties, especially under severe conditions. Preferably, the organic salt is a water soluble carboxylate salt such as sodium or potassium salicylate or the like. However, this salt is not required in all cases.

In instances where the viscoelastic surfactant is an amine acid salt or a quaternary ammonium salt, the associated anion should be an inorganic anion, preferably an inorganic anion such as a sulfate, nitrate, perchlorate or halide. A halide (Cl, Br or I) is preferred, Cl and Br being most preferred.

The optional organic salt constituent used with the viscoelastic surfactant, when employed, is preferably a water soluble compound involving typically a sodium or potassium salt of an organic anion. The anion may be an aromatic organic anion such as a salicylate, naphthalene sulfonate, toluene sulfonate, xylene sulfonate, p- and m-chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6,-tetrachlorophenate, p-methyl phenate, m-chlorophenate, 3,5,6-trichloropicolinate, 4-amino-3,5,6-trichloropicolinate, 2,4,-dichlorophenoxyacetate, a,β-naphthols, p,p'bisphenol A or cocoamidopropyl dimethyl amine oxide. The viscoelastic surfactant and optional organic salt combination should be chosen such that the anion is compatible with the electrolyte present in the aqueous solution such that undesirable precipitates are not formed. Also the specific anion chosen will depend to some degree on the specific amine structure. In some applications, only organic salts may be present. While not wishing to be bound to any particular theory, some anionic species are required when quaternary ammonium salts are used. The salt helps to neutralize the repulsive forces exhibited when two cationic species approach each other. Organic salts and inorganic salts do this in different ways. The inorganic salts tend to neutralize the charge by associating with the cationic surfactant. The organic anions that are most effective tend to be incorporated as part of the micelle structure with the hydrophobic portion of the organic anion lying inside the micelle. Thus, the two species work differently and yield different properties. The choice of when to use either organic, inorganic or a mixture thereof depends on the properties desired. Organic anions tend to be required for higher temperature applications, for example, above about 175° F.

The viscoelastic surfactant and associated water soluble organic salt, if any, is typically provided as a concentrated aqueous solution. Any concentration of the viscoelastic surfactant in the fracturing fluid that provides sufficient viscosity without impairing the function of the fracturing fluid or a component thereof can be used. Typically, the viscoelastic surfactant is present at about at least 3 gallons per thousand gallons carrier fluid, in order to impart sufficient viscosity to the fluid, to no more than about 200 gallons per thousand gallons carrier fluid, to limit the requirement of excessive horsepower required to pump highly viscous fluids and to limit the cost of the fluid.

The FLA comprising a polymer and a crosslinker can be selected from any of a large number of polymer-crosslinker systems. The primary criterion for the selection of a particular crosslinkable polymer system is that the polymer and crosslinker interact and form either crosslinked gel aggregates or a continuous three-dimensional gel network prior to the fluid reaching the sand face or the fracture face. Either aggregates or a network will reduce fluid invasion into porous media by forming a filter cake on the face of the formation.

U.S. Pat. No. 5,486,312 describes some of the typical polymer-crosslinker systems that can be employed. Typically, the crosslinkable polymer is water-soluble. Common classes of water-soluble crosslinkable polymers include polyvinyl polymers, polymethacrylamides, cellulose ethers, polysaccharides, lignosulfonates, and ammonium, alkali metal, and alkaline earth salts thereof. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinly acetate, polyalkyleneoxides, carboxycelluloses, carboxyalkylhydroxyethyl celluloses, hydroxyethlcellulose, galactomannans (e.g., guar gum), substituted galactomannans (e.g., hydroxypropyl guar, carboxymethyl hydroxypropyl guar, and carboxymethyl guar), heteropolysaccharides obtained by the fermentation of starch-derived sugar (e.g., xanthan gum), and ammonium and alkali metal salts thereof. Polymers may be chemically modified, including hydrophobically modified, provided that the modified polymers remain water soluble and crosslinkable. Preferred water-soluble crosslinkable polymers include hydroxyethyl cellulose, starch, scleroglucan, galactomannans, and substituted galactomannans. As used herein, the term "starch" is understood to include one or more natural starches, one or more chemically modified starches, and mixtures of one or more natural and/or chemically modified starches. The crosslinkable polymer is available in several forms such as a water solution or broth, a gel solution, a dried powder, a hydrocarbon emulsion or dispersion. As is well known by those skilled in the art, different types of equipment are employed to handle, mix, and pump these different forms of crosslinkable polymers.

With respect to crosslinking agents, these agents are organic and inorganic compounds well known to those skilled in the art. Exemplary organic crosslinking agents include, but are not limited to aldehydes, dialdehydes, phenols, substituted phenols, and ethers. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-napthyl acetate, phenyl chloroacetate, hydroxyphenylalkanols, formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether are some of the more common organic crosslinking agents. Typical inorganic crosslinking agents are polyvalent metals, chelated polyvalent metals, and compounds capable of yielding polyvalent metals. Some of the more common inorganic crosslinking agents include chromium salts, aluminates, gallates, titanium chelates, aluminum citrate, chromium citrate, chromium acetate, chromium propionate, and zirconium chelates or complexes. Crosslinkers such as boric acid, boron salts, and organic boron compounds are particularly effective for crosslinking guar and substituted guar materials. Individual or mixtures of crosslinking agents are used in the present invention.

The following references have useful information regarding polymer-crosslinker systems that are applicable in this invention: Economides, M. J. and Nolte, K. G., *Reservoir Stimulation,* 3$^{rd}$ Edition, John Wiley and Sons, New York, 2000, Chapter 7; U.S. Pat. Nos., 6,024,170; 5,697,444; 5,827,804; 5,658,861; 5,877,127; 4,488,975; 5,466,846; 5,182,408; U.S. Pat. Nos. 5,246,073; 5,335,733; 5,486,312; and 5,617,920 (all four assigned to Unocal); U.S. Pat. Nos. 4,683,949; and 5,947,644 (both assigned to Marathon Oil Co), and Sydansk, R. D., "A New Conformance-Improvement-Treatment Chromium(III) Gel Technology," SPE Paper 17329, 1988. The Unocal and Marathon patents teach the application of these materials in a manner that enables the polymer systems to invade the porous media, but it is well known that one can accelerate crosslinking by various means, such as catalysis, use of weaker metal ion-ligand combinations, etc. For example, U.S. Pat. No. 4,521,452 describes polyacrylamide crosslinked by mixing it with a combination of certain amines and certain aldehydes; crosslinking occurs within several seconds. The aforementioned Sydansk reference focuses on high molecular weight polyacrylamide with chromium acetate crosslinker, but many trivalent chromium materials are effective, such as chromium chloride, chromium nitrate, chromium propionate, chromium lactate, or chromium malonate, among others. Chromium chloride and chromium nitrate crosslinkers will specifically cause rapid crosslinking, and are preferred. The concentrations of the selected materials should be those that enable the creation of the crosslinked aggregates or the creation of a three-dimensional gel network prior to the fracturing fluid entering the formation. As a result, the polymer can be crosslinked to an extent that it forms a filter cake on the fracture face or the sand face. The filter cake has low permeability to water, and thus reduces fluid loss. Many polymer-crosslinker systems can be employed and those skilled in the art will understand which systems to employ based on ease of mixing, temperature of application, cost, rate of crosslinking, or compatibility with the VES gelling agent, among other considerations.

Preferably, the polymer component of the FLA is selected from polysaccharides, cellulose, hydroxyethyl cellulose (HEC), polyacrylamides, or starch. Exemplary polysaccharides include, but are not limited to, guar, hydroxypropyl guar, carboxymethyl guar, carboxymethyl hydroxypropyl guar, galactomannan, and xanthan. Preferably, the polymer comprises guar or modified guar.

The polymer is typically provided as a solid, preferably a substantially pure solid, although it can be provided as a slurry. Any concentration of the polymer which reduces fluid loss can be used. Typically, the concentration of the polymer sufficient to reduce fluid loss is less than the concentration of the polymer required in a polymer-based fracturing fluid to render the fluid sufficiently viscous to transport proppant. The concentration of the polymer in the VES-based fracturing fluid is preferably less than about 15 lb per thousand gal carrier fluid, and most preferably less than about 10 lb per thousand gal carrier fluid. Higher polymer concentrations are effective, but normally provide no significant improvement and are more costly. However, this does not rule out the possibility that under certain conditions, with specific choices of surfactants, polymers and additives, higher concentrations might be beneficial.

The crosslinker functions to cross-link the polymer. If cross-linking does not occur, it is believed that the non-cross-linked polymer can migrate through the formation face and into the formation. This greatly reduces the effectiveness of the polymer as a fluid loss control additive. The crosslinker can be any compound known to cross-link the polymer in question. For example, the crosslinker can be a transition metal compound, an organometallic crosslinker, a boron compound, an organic crosslinker (e.g. an aldehyde, acetaldehyde, an aldehyde precursor such as hexamethylenetetramine, an aldehyde phenol, an aldehyde in combination with phenol acetate, an aldehyde in combination with hydroxy benzoic acid, an aldehyde in combination with phenol salicylate, an aldehyde in combination with furfuryl alcohol, glutaraldehyde, glyoxal, or trioxane, among others) or mixtures of these. Preferably, the crosslinker comprises titanium, chromium, iron, aluminum, boron, zirconium, or a mixture of these. More preferably, the crosslinker comprises boron or, when the polymer is guar or a derivatized guar, zirconium.

Optionally, the composition can further comprise FLAs already known in the art, such as starch, mica, calcite, or silica. One or more such known FLAs can be used.

The composition can optionally further comprise a crosslinking delay agent (for example, bicarbonate salt, sorbitol, or mannitol, which delays crosslinking of guar or substituted guars such as carboxymethylhydroxypropylguar), a viscosity breaker agent, or one or more other additives, such as scale inhibitors, surfactants, biocides, demulsifiers, and breaker aids. Also optionally, the fracturing fluid can contain materials designed to limit proppant flowback after the fracturing operation is complete by forming a porous pack in the fracture zone. Such materials can be any known in the art, such as are available from Schlumberger under the tradename PropNET™ (for examples see U.S. Pat. Nos. 5,330, 005; 5,439,055; and 5,501,275). Exemplary proppant flowback inhibitors include fibers or platelets of novoloid or novoloid-type polymers (U.S. Pat. No. 5,782,300),. Other additives that may be included include those described by Economides, M. J. and Nolte, K. G., *Reservoir Stimulation,* 3$^{rd}$ Edition, John Wiley and Sons, New York, 2000, Chapter 7.

A stabilizing agent can optionally be included in order to stabilize the polymer in the FLA.

The fluid can also optionally comprise a breaker. The purpose of a breaker is to diminish the viscosity of the fracturing fluid at the end of pumping so that the fluid is more easily recovered from the fracture during clean-up. Examples of breakers suitable for use in the method of the present invention include bacteria, enzymes such as galactomannanase (for breaking polysaccharides based on galactomannan) and oxidizers such as ammonium persulfate. Additionally, the breakers can be encapsulated to delay their release, for example as described in U.S. Pat. No. 4,741,401.

The fracturing fluid can also comprise a proppant. Suitable proppants include, but are not limited to, sand, resin-coated sand, bauxite, glass beads, and ceramic beads. If sand is used, it will typically be from about 12 to about 100 U.S. Standard Mesh in size. Mixtures of suitable proppants can be used. Optionally, the proppant or proppants can be coated with a resin to allow consolidation of the proppant particles into a mass. Optionally, an activator can also be used to activate the resin and consolidate the proppant. One example of such a resin-coated proppant and activator combination is available from Santrol under the tradenames SDC-DS (proppant) and SSE (activator). The proppant can also be impregnated with scale inhibitors, breakers, demulsifiers, or other compounds. The concentration of proppant in the fracturing fluid can be any concentration known in the art, and will typically be in the range of about 0.5 to about 20 ppa (pounds of proppant added) per gallon of clean fluid.

The fracturing fluid can be prepared at the surface by combining the carrier fluid, the viscoelastic surfactant, and the polymer and the crosslinker, or the crosslinked polymer. This preparation method is called batch mixing. Optional additives can also be included. Alternatively, one or more components, for example the crosslinker, or the breaker if used, can be stored separately and injected into the flowing fluid stream in a continuous mix process known as "on the fly" mixing.

In the fracturing method of the present invention, techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Economides and Nolte, Reservoir Stimulation, 3$^{rd}$ Edition, John Wiley and Sons, New York, 2000, Ch. 5.

In some fracturing embodiments, the method is performed by preparing a fracturing fluid, comprising a carrier fluid; a viscoelastic surfactant; and an FLA comprising a polymer selected from polysaccharides, cellulose, hydroxyethyl cellulose (HEC), polyacrylamides, or starch, and a crosslinker. The fracturing fluid is then injected into the formation at a pressure sufficient to create or extend a fracture into the formation. During the injection process, the crosslinked polymer forms a filter cake on the formation face. The filter cake reduces fluid loss to the formation by providing a relatively impermeable barrier to water or fracturing fluid.

The FLA can be used at all stages of the treatment. Adequate results are often achieved by applying the FLA during the initial proppant-free stage called a pad only.

In one embodiment, after the fracture has been created or extended by a pad, subsequent fluid volumes are injected into the wellbore, wherein the subsequent fluid volumes comprise a carrier fluid, a viscoelastic surfactant, a proppant, and any other additives (except for the polymer and crosslinker FLA). The proppant lodges in the fracture and will hold it open after the pressure is removed.

In an alternative embodiment, the fracturing fluid injected to create or extend the fracture comprises a proppant, in addition to the carrier fluid, the viscoelastic surfactant, and the polymer and the crosslinker. Upon injection, the fracturing fluid creates or extends a fracture into the formation; the crosslinked polymer forms a filter cake on the formation face, thus reducing fluid loss; and the proppant lodges in the fracture and will hold it open after the pressure is removed.

In another embodiment, the present invention is directed to a gravel packing fluid. The carrier fluid and the viscoelastic surfactant are as described above. Any concentration of the viscoelastic surfactant in the gravel packing fluid that provides sufficient viscosity without impairing the function of the fluid or a component thereof can be used. Typically, the viscoelastic surfactant is present at about at least 3 gallons per thousand gallons carrier fluid, in order to impart sufficient viscosity to the fluid, to no more than about 200 gallons per thousand gallons carrier fluid, in order to limit the requirement of excessive horsepower required to pump highly viscous fluids and to limit the cost of the fluid.

The FLA comprising a polymer and a crosslinker can be selected from any of a large number of polymer-crosslinker systems as described above. Preferred water-soluble crosslinkable polymers include polysaccharides, cellulose, hydroxyethyl cellulose (HEC), polyacrylamides, or starch.

Any concentration of the polymer which reduces fluid loss can be used. Typically, the concentration of the polymer sufficient to reduce fluid loss is less than the concentration of the polymer required in a polymer-based fracturing fluid to render the fluid sufficiently viscous to transport proppant. The concentration of the polymer in the VES-based gravel packing fluid is less than about 25 lb per thousand gal carrier fluid, preferably less than about 15 lb per thousand gal carrier fluid, and more preferably less than about 10 lb per thousand gal carrier fluid.

Crosslinkers such as boric acid, boron salts, and organic boron compounds are particularly effective for crosslinking guar and substituted guar materials. Salts, acids, and organic metallic compounds of metalloids and metals with empty d-orbitals are also effective at crosslinking guar or derivatized guar. Preferably, the crosslinker comprises titanium, chromium, iron, aluminum, boron, or zirconium. More preferably, the crosslinker comprises boron or zirconium.

By use of the polymer and the crosslinker, the polymer can be crosslinked to an extent that it forms a filter cake on the sand face. The filter cake has low permeability to water, and thus reduces fluid loss. Many polymer-crosslinker systems can be employed and those skilled in the art will understand which systems to employ based on ease of mixing, temperature of application, cost, rate of crosslinking, or compatibility with the VES gelling agent, among other considerations.

Optionally, the composition can further comprise an FLA known in the art, such as starch, mica, calcite, or silica. One or more such known FLAs can be used.

The composition can optionally further comprise a crosslinking delay agent (for example, a bicarbonate salt, which delays zirconium crosslinking of guar or substituted guars such as carboxymethylhydroxypropylguar), a viscosity breaker agent, or one or more other additives, such as scale inhibitors, surfactants, biocides, demulsifiers, or breaker aids. Also optionally, the gravel packing fluid can contain gravel or other materials suitable for forming a porous pack that allows production of fluids while inhibiting the flow of sand into the wellbore. Such materials can be any known in the art.

A stabilizing agent can optionally be included in order to stabilize the polymer in the FLA.

The fluid can also optionally comprise a breaker. The purpose of a breaker is to diminish the viscosity of the gravel packing fluid so that the fluid is more easily recovered from the wellbore during clean-up. Examples of breakers suitable for use in the method of the present invention include bacteria, enzymes such as galactomannanase (for breaking polysaccharides based on galactomannan) and oxidizers such as ammonium persulfate. Additionally, the breakers can be encapsulated to delay their release, for example as described in U.S. Pat. No. 4,741,401.

The gravel packing fluid can be prepared at the surface by combining the carrier fluid, the viscoelastic surfactant, and the polymer and the crosslinker or the crosslinked polymer. This preparation method is called batch mixing. Optional additives can also be included. Alternatively, one or more components, for example the crosslinker, or the breaker if used, can be stored separately and injected into the flowing fluid stream in a continuous mix process known as "on the fly" mixing.

In the gravel packing method of the present invention, techniques for gravel packing a wellbore will be known to persons of ordinary skill in the art, and will involve pumping the gravel packing fluid into the borehole.

In all gravel packing embodiments, the method is performed by preparing a gravel packing fluid, comprising a carrier fluid, a viscoelastic surfactant, and an FLA comprising a polymer and a crosslinker. The gravel packing fluid is then injected into the wellbore at a pressure below the minimum in situ rock stress of the formation. During the injection process, the crosslinked polymer forms a filter cake on the formation face. The filter cake reduces fluid loss to the formation by providing a relatively impermeable barrier to water.

In one embodiment, after the gravel packing fluid described above and not comprising gravel has been injected into the wellbore, subsequent fluid volumes are injected into the wellbore, wherein the subsequent fluid volumes comprise a carrier fluid, a viscoelastic surfactant, and gravel or other gravel packing material. An FLA is not necessary in the second fluid of this embodiment. The gravel lodges in the annular space of the wellbore between the screen and the formation and will inhibit particulate production during fluid production from the well.

In an alternative embodiment, the gravel packing fluid first injected into the wellbore further comprises gravel or other gravel packing material. The gravel lodges in the annular space of the wellbore between the screen and the formation and will inhibit particulate production during fluid production from the well.

In another embodiment of this invention, the fluid loss rate of drilling fluids and drill-in fluids formulated with viscoelastic surfactants can be reduced by preparing a drilling or drill-in fluid, comprising a wellbore service fluid as described above. The drilling or drill-in fluid is circulated through the drill string and up the annulus in a manner that removes drill cuttings and lubricates the drill string. During the circulation process, the crosslinked polymer forms a filter cake on the formation face. The filter cake reduces fluid loss to the formation by providing a low permeability barrier. The carrier fluid, viscoelastic surfactant, and FLA are as described above The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Static Fluid Loss Tests

Fluid loss tests were performed using a static test method with a 3 μm aloxite disc representing the porous medium (permeability approximately 400 mD), with an 85 psi pressure differential (4000 psi/linear foot) at 150° F. Initially, 100 mL of a given fluid was put in the High Temperature High Pressure cell. Leak-off in grams was measured at various time points up to about 60 min. The static fluid loss test was performed following Economides and Nolte, *Reservoir Stimulation*, 3$^{rd}$ Edition, John Wiley and Sons, New York, 2000, Ch. 8, pp. 8–23 to 8–26.

Eleven aqueous fluids were prepared, as follows:

TABLE 1

| Fluid No. | Components (other than water) |
|---|---|
| 1 | 25 gpt VES + 15 ppt calcite + 10 ppt guar + 4 gpt boron crosslinker + 4 wt % KCl |
| 2 | 25 gpt VES + 10 ppt guar + 4 gpt boron crosslinker + 4 wt % KCl |
| 3 | 100 gpt VES + 4 wt % KCl |
| 4 | 25 gpt VES + 25 ppt guar + 4 wt % KCl |
| 5 | 25 gpt VES + 25 ppt calcite/starch blend + 4 wt % KCl |
| 6 | 25 gpt VES + 75 ppt calcite/starch blend + 4 wt % KCl |
| 7 | 25 gpt VES + 5 ppt guar + 4 gpt boron crosslinker + 4 wt % KCl |
| 8 | 25 ppt guar + 2 wt % KCl |
| 9 | 25 gpt VES + 25 ppt HEC + 4 wt % KCl |
| 10 | 25 ppt guar + 1.5 ppt boron crosslinker + 2 wt % KCl |
| 11 | 25 gpt VES + 4 wt % KCl | gpt: gal per thousand gal carrier fluid;
ppt: lb per thousand gal carrier fluid

The tested VES consisted essentially of a 61% solution of erucyl bis(2-hydroxyethy)methyl ammonium chloride in alcohol and water.

The boron crosslinker consisted of sodium tetraborate decahydrate in an antifreeze solvent package, except for the boron crosslinker in Test 10, which is boric acid. All fluids with guar and boron have a pH of between 8.6 and 10.

The calcite had the following characteristics:

| Mesh Size | Wt % of calcite passed |
|---|---|
| 18 Mesh | 100 |
| 30 Mesh | 96.3 |
| 50 Mesh | 92.4 |
| 80 Mesh | 88.6 |
| 140 Mesh | 84.7 |
| 270 Mesh | 80.9 |
| 400 Mesh | 77.0 |

The starch/calcite blend comprised 33% pregelatinized soluble starch, 65% of calcite, and the balance silica and other additives commonly used to enhance flow and handling of the suspension in the field.

Figure 1:
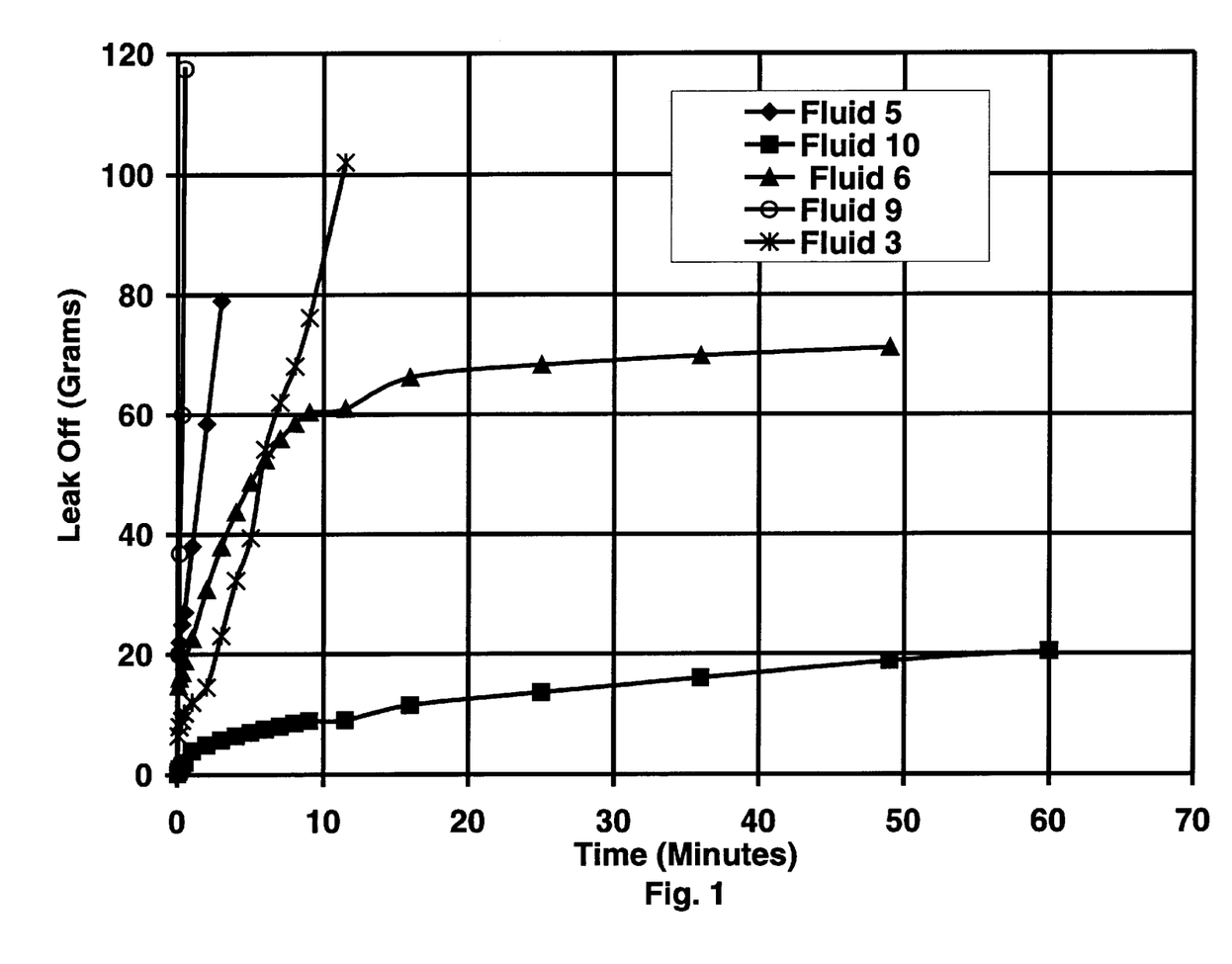
FIGS. 1 and 2 show the results of static fluid loss experiments performed on a set of eleven sample fluids as shown in Table 1.
Figure 2:
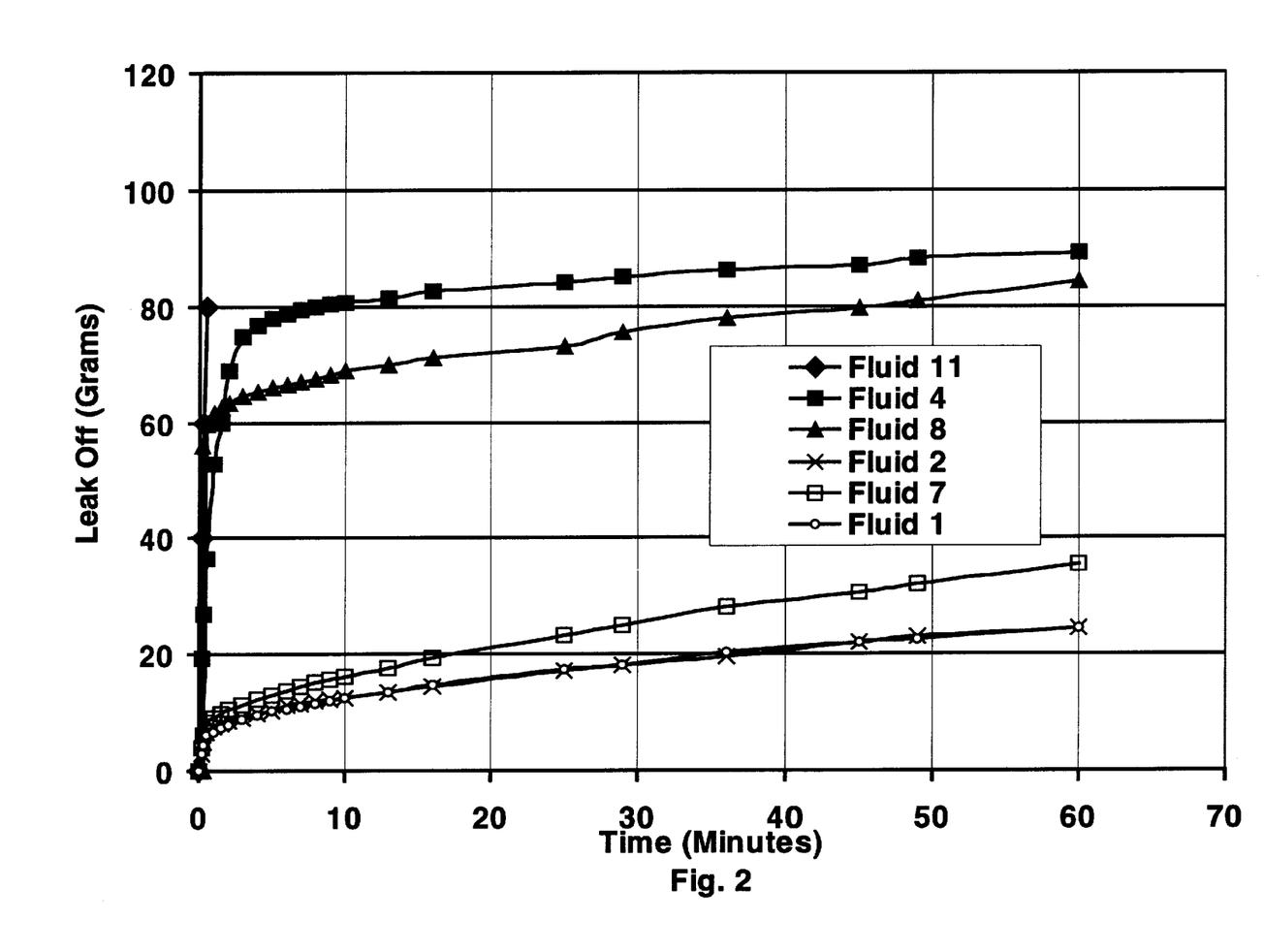

The results of these experiments are shown in FIGS. 1 and 2. The choice of whether a fluid is shown of FIG. 1 or FIG. 2 is made solely for the sake of clarity in understanding the Figures. To summarize, fluid 10 represents a polymer-based fracturing fluid as known in the art, and fluid 11 represents a VES-based fracturing fluid as known in the art (See U.S. Pat. No. 5,964,295.). Fluid 11 undergoes rapid, undesirably high leak-off (80 g by about 2 min) into this high permeability disc. Fluid 3 represents a VES-based fracturing fluid with greatly increased viscosity (brought about by a 4-fold increase in the concentration of the viscoelastic surfactant). The leak-off of fluid 3 is less rapid than that of fluid 11, but remains undesirably high (100 g by about 15 min).

Another known mechanism of reducing fluid loss from a VES-based fracturing fluid is the addition of a calcite/starch blend, as represented by fluids 5 and 6. However, the calcite/starch blend failed to reduce fluid loss satisfactorily, especially early fluid loss (also known as spurt), even at 75 ppt calcite/starch.

Next, fluid 4 features the VES-based fluid 11 with the addition of 25 ppt guar. Fluid 8 is the polymer-based fracturing fluid 10 without the crosslinker. Thus, no crosslinker was included in fluids 4 or 8. Guar was expected to form a filter cake, but only slowly, and fluids 4 and 8 did reduce the rate of fluid loss, but only after a major spurt loss (about 70 g within about 5 min). Thus a crosslinkable polymer such as guar, that will slowly form a filter cake without a crosslinker being present, will reduce fluid loss somewhat, but not as effectively as when a crosslinker is present. Fluid 9 was similar to fluid 4, except that it contained hydroxyethylcellulose (HEC) instead of guar. HEC was not expected to form a filter cake, and exhibited very rapid leak-off (comparable to fluid 11).

The observations described above demonstrate that fluids with comparable viscosity, but different microstructures, can have very different leak-off characteristics.

Fluids 2 and 7 represent fracturing fluids according to the present invention. These fluids differ in that the guar concentration is 10 ppt in fluid 2 and 5 ppt in fluid 7. Boron crosslinker is present in both fluids at 4 gpt. FIG. 2 shows that both fluids 2 and 7 had very low spurt (no more than about 10 g within 5 min), and thereafter lost only about 5–10 g for the remainder of the 60 min observation period.

The low polymer concentrations used in fluids 2 and 7 did not form a continuous elastic network of crosslinked polymer under these conditions with the particular polymer and crosslinker used. In addition, the viscosity of the fluid changed negligibly, further indicating that fluid microstructure, and not viscosity per se, is more important in determining the fluid loss characteristics of a fluid. It was concluded that gel aggregates were formed that were too large to pass through pore throats, and instead rapidly formed a low permeability filter cake that reduces fluid loss.

Fluid 1 is identical to fluid 2 except for the addition of 15 ppt calcite. This fluid was examined to determine if the addition of a conventional fluid loss control additive would enhance the performance of the polymer and crosslinker system. As shown in FIG. 2, the addition of 15 ppt calcite did not improve the fluid loss characteristics (compare fluids 1 and 2, which gave virtually indistinguishable results) under the experimental conditions used.

EXAMPLE 2

Dynamic Fluid Loss Tests

Similar results were observed during dynamic fluid loss tests (see Navarrete, R. C., Caweizel, K. E., and Constien, V. G.: "Dynamic Fluid Loss in Hydraulic Fracturing Under Realistic Shear Conditions in High-Permeability Rocks," SPE Production and Facilities, pp 138–143 (August, 1996) for details of the test method) as shown in Table 2.

TABLE 2

Summary of dynamic fluid loss data. The base fluid is water containing 20 gpt VES + 4 wt % KCl by weight.

| System | Spurt (gal/100 ft 2) | Cw (ft/min$^{1/2}$) | Cv (ft/min$^{1/2}$) | % Regained Permeability |
|---|---|---|---|---|
| 20 gpt VES + 4% KCl | — | — | 0.8 | 89 |
| +17 gpt PVA | — | — | 1.2 | 5 |
| +10 ppt guar + 4 gpt boron crosslinker (pH = 9.6) | 22.5 | 0.0119 | — | 65 |
| +5 ppt guar + 4 gpt boron crosslinker (pH = 9.6) | 66.4 | 0.0108 | — | 54 |
| +25 ppt calcite/starch blend | 53.5 | 0.0027 | — | 69 |
| +10 ppt guar + 4 gpt boron crosslinker (pH = 9.6) + calcite/starch blend | 23.3 | 0.0027 | — | 82 |
| +25 ppt FLO-TROL | — | — | 0.6 | 6 |

Cw: wall-building fluid loss coefficient;
Cv: viscosity controlled fluid loss coefficient Gpt: gal per thousand gal carrier fluid; ppt: lb per thousand gal carrier fluid.

Cw is not applicable where not shown because there is no wall-building material present. Cv is not applicable where there is a low, finite Cw. PVA is a solution of crosslinked polyvinyl alcohols that is too small to form a filter cake and small enough to invade the porous medium, as evidenced by the failure to demonstrate a Cw and by the very low regained permeability. The guar, boron crosslinker, and the starch/calcite blend are as described above. FLO-TROL is an uncrosslinked starch fluid loss control additive commercially available from MI Drilling. It shows the same poor performance as the PVA in this test.

In conclusion, a VES-based wellbore service fluid comprising guar and a crosslinker exhibited fluid loss characteristics superior to other VES-based fracturing fluids, including those incorporating known calcite/starch FLAs. Although VES fluids demonstrate some fluid loss control, especially in low permeability formations, it is clear that, especially in higher permeability formations, a fluid loss control additive is effective when it contains materials, such as crosslinked polymers, that are large enough so that they do not invade the formation, but rather rapidly form a relatively impermeable filter cake. Addition of a calcite-based FLA to a VES-based fracturing fluid comprising guar and a crosslinker did not improve the spurt loss characteristics of the fluid under the conditions tested here. However, this does not rule out the possibility of optimal loadings of some conventional fluid loss control additives that under specific conditions (of permeability, or shear across the face of the fracture) may be beneficial at reducing spurt loss.

While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims

What is claimed is:

1. A wellbore service fluid, comprising:
   a carrier fluid;
   a viscoelastic surfactant; and,
   a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss.

2. The fluid of claim 1, wherein the polymer is selected from polysaccharides, cellulose, hydroxyethyl cellulose (HEC), polyacrylamides, or starch.

3. The fluid of claim 2, wherein the polymer is a polysaccharide selected from xanthan, guar, or substituted guar.

4. The fluid of claim 3, wherein the polymer comprises guar.

5. The fluid of claim 1, wherein the polymer is present at less than about 10 pounds per thousand gallons carrier fluid.

6. The fluid of claim 1, wherein the crosslinker comprises a metalloid or metal compound comprising an empty d-orbital.

7. The fluid of claim 6, wherein the crosslinker comprises boron or zirconium.

8. The fluid of claim 7, wherein the crosslinker comprises boron present at less than about 250 ppm boron.

9. The fluid of claim 1, wherein the viscoelastic surfactant is present from about 3 gallons per thousand gallons carrier fluid to about 200 gallons per thousand gallons carrier fluid.

10. The fluid of claim 1, wherein the viscoelastic surfactant comprises a compound selected from erucyl bis(2-hydroxyethyl) methyl ammonium chloride, oleic acid, euric amide propyl dimethyl betaine, or oleic amide propyl dimethyl betaine.

11. The fluid of claim 1, further comprising a proppant.

12. The fluid of claim 11, wherein the proppant is impregnated with a scale inhibitor, a breaker, or a demulsifier.

13. The fluid of claim 1, further comprising gravel.

14. The fluid of claim 1, further comprising a breaker.

15. The fluid of claim 1, further comprising a fluid loss control additive comprising an inorganic solid or starch fluid loss control additive or mixtures thereof.

16. The fluid of claim 15, wherein the inorganic solid is silica, mica, limestone, rock salt, kaolin, talc, alumina or mixtures thereof.

17. A method of treating a subterranean formation, comprising providing a wellbore service fluid comprising a carrier fluid; a viscoelastic surfactant; and at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates; and introducing the wellbore service fluid into a wellbore under conditions such that a filter cake is formed.

18. The method of claim 17, wherein the viscoelastic surfactant is present in the fluid at about 3 gallons per thousand gallons carrier fluid to about 200 gallons per thousand gallons carrier fluid, and the polymer is present at less than about 10 pounds per thousand gallons carrier fluid.

19. The method of claim 17, wherein the polymer is selected from polysaccharides, cellulose, hydroxyethyl cellulose (HEC), polyacrylamides, or starch.

20. The method of claim 19, wherein the polymer is a polysaccharide selected from xanthan, guar, or substituted guar.

21. The method of claim 17, wherein the wellbore service fluid further comprises a fluid loss control additive comprising an inorganic solid or starch or mixtures thereof.

22. The method of claim 17, wherein the method of treating is a method of fracturing a subterranean formation, comprising: providing a fracturing fluid comprising a carrier fluid; a viscoelastic surfactant; and a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates; and,
   injecting said fracturing fluid into the formation under conditions such that a filter cake is formed at a pressure sufficiently high to fracture the formation.

23. The method of claim 17, wherein the method of treating is a method of fracturing a subterranean formation, comprising:
   providing a first fracturing fluid comprising a carrier fluid; a viscoelastic surfactant; and a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates;
   injecting said first fracturing fluid into the formation under conditions such that a filter cake is formed at a pressure sufficiently high to fracture the formation;
   providing a second fracturing fluid comprising a carrier fluid; a viscoelastic surfactant; and a proppant; and,
   injecting said second fracturing fluid into the formation at a pressure sufficiently high to fracture the formation under conditions that will result in said proppant being retained in the fracture.

24. The method of claim 23, wherein the second fracturing fluid further comprises a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss.

25. The method of claim 17, wherein the method of treating is a method of gravel packing a wellbore, wherein the wellbore comprises a screen, a formation face, and an annular space defined therebetween, comprising:
   providing a gravel packing fluid comprising a carrier fluid; a viscoelastic surfactant; and a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss; and,
   injecting said gravel packing fluid into said wellbore under conditions such that a filter cake is formed and that will result in gravel being retained in said annular space.

26. The method of claim 17, wherein the method of treating is a method of gravel packing a wellbore, wherein the wellbore comprises a screen, a formation face, and an annular space defined therebetween, comprising:

provideing a first gravel packing fluid comprising a carrier fluid; a viscoelastic surfactant; and a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss;

injecting said first gravel packing fluid into the wellbore under conditions such that a filter cake is formed;

providing a second gravel packing fluid comprising a carrier fluid; a viscoelastic surfactant; and gravel; and, injecting said second gravel packing fluid into said wellbore under conditions that will result in gravel being retained in said annular space.

27. The method of claim 26, wherein the second gravel pack fluid comprises a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss.

28. The method of claim 17, wherein the method of treating is a method of drilling a well comprising:

operating a drill bit to cause penetration of the earth to form a borehole; and, circulating into the borehole a drilling fluid wherein said drilling fluid comprises a carrier fluid; a viscoelastic surfactant; and a fluid loss control additive comprising at least one polymer and at least one crosslinker; said polymer and said crosslinker forming a crosslinked polymer; said crosslinked polymer being present in a concentration of less than about 15 pounds per thousand gallons; and said crosslinked polymer comprising a three-dimensional polymer network or gel aggregates large enough to form a filter cake and reduce fluid loss.

29. The method of claim 28, wherein the method of drilling is carried out in the producing zone of a well.

* * * * *